United States Patent [19]

Morisawa

[11] Patent Number: 4,817,474
[45] Date of Patent: Apr. 4, 1989

[54] HYDRAULIC PRESSURE CONTROL APPARATUS FOR USE IN AUTOMATIC TRANSMISSION

[75] Inventor: Kunio Morisawa, Okazaki, Japan

[73] Assignee: Toyota Jidosha Kabushiki Kaisha, Toyota, Japan

[21] Appl. No.: 103,412

[22] Filed: Oct. 1, 1987

Related U.S. Application Data

[62] Division of Ser. No. 715,820, Mar. 25, 1985, Pat. No. 4,719,822.

[30] Foreign Application Priority Data

Apr. 4, 1984 [JP] Japan .................................. 59-65819
Jul. 9, 1984 [JP] Japan ................................. 59-140613
Jul. 9, 1984 [JP] Japan ..................................... 140614
Jul. 18, 1984 [JP] Japan ................................ 59-147677

[51] Int. Cl.$^4$ ............................................. B60K 41/16
[52] U.S. Cl. ........................................ 74/869; 74/868
[58] Field of Search ................................. 74/868, 869

[56] References Cited

U.S. PATENT DOCUMENTS

| | | | |
|---|---|---|---|
| 3,937,108 | 2/1976 | Will | 74/869 X |
| 4,307,631 | 12/1961 | Iwanaga et al. | 74/869 |
| 4,526,065 | 7/1985 | Rosen et al. | 74/869 |
| 4,537,095 | 8/1985 | Morisawa | 74/869 X |
| 4,539,869 | 9/1985 | Suga et al. | 74/869 X |
| 4,566,355 | 1/1986 | Sugano | 74/869 |

*Primary Examiner*—Dirk Wright
*Attorney, Agent, or Firm*—Oblon, Fisher, Spivak, McClelland & Maier

[57] ABSTRACT

The brake B1 is engaged by supply of fluid pressure when the transmission provides the 2nd speed stage, while the brake B2 is engaged by supply of fluid pressure when the transmission provides the 1st speed stage with engine braking. The brakes B1 and B2 should not be co-engaged. A second speed holding valve 216 is provided to conduct therethrough the line pressure transmitted through ports 190 and 194 of the 1-2 shift valve 184 toward the brake B1 when the 2-range detent pressure from the manual valve 46 is not supplied at its port 224 or the 2-range detent pressure is supplied at its port 224 but the L-range detent fluid pressure from the manual valve 46 is also supplied at its port 236 so that its spool 234 is ascended by the spring, and to conduct through the ports 232 and 222, when the spool 234 is descended by supply of only the 2-range detent pressure at its port 224, the line pressure transmitted through ports 226 and 228 of the shift valve 220 which supplies fluid pressure to the brake B2 when the L-range detent pressure is supplied at its port 204. Coengagement of the brakes B1 and B2 in L-range due to sticking of the spool 234 at the descended position is avoided by intercepting the supply of fluid pressure to the brake B1 at the ports 226 and 228 which are separated by the spool 212 descended in L-range.

3 Claims, 11 Drawing Sheets

HYDRAULIC PRESSURE CONTROL APPARATUS FOR USE IN AUTOMATIC TRANSMISSION

This is a division, of application Ser. No. 06/715,820, now U.S. Pat. No. 4,719,822, filed Mar. 25, 1985.

BACKGROUND OF THE INVENTION

1. Field of the Invention

This invention relates to a hydraulic pressure control apparatus for use in an automatic transmission for an automobile.

2. Description of the Prior Art

In a hydraulic pressure control apparatus for use in an automatic transmission, a speed stage is determined in relation to the throttle position in an intake path and vehicle speed, and usually the shift-down is carried out from a third speed to a first speed through a second speed. Since the speed stage in the second speed and the third speed is performed usually by the engagement of a hydraulic frictional engaging device, the output torque of an engine is decreased when a throttle valve in the intake path is almost fully closed, and the drive torque becomes negative when the speed change is carried out from the third speed to the second one, thereby presenting a problem in that blowing sounds take place in a drive system.

The hydraulic pressure control apparatus proposed to overcome such a problem comprises:
- a throttle valve for producing a throttle pressure as a hydraulic pressure related to an intake throttle position;
- a governor valve for producing a governor pressure as a hydraulic pressure related to the vehicle speed;
- a 1-2 shift valve for changing over the first speed and the second speed in relation to the throttle pressure and the governor pressure; and
- a 2-3 shift valve for changing over the second speed and the third speed in relation to the throttle pressure and the governor pressure and permitting a line pressure from the 1-2 shift valve in the second speed position to act as the third speed position holding pressure so as to reduce a working force due to the throttle pressure in the third speed position of a D-range.

Accordingly, since in the low throttle position and the 2-3 shift valve the working force due to the throttle pressure is offset by the third speed position holding pressure, the 2-3 shift valve serves to hold the third speed position until the governor pressure reaches a very small value, i.e., the vehicle speed reaches a very small value. On the other hand, the 1-2 shift valve is changed over from the second speed position to the first speed position by the throttle pressure when the governor pressure is reduced and thereby the third speed position holding pressure also disappears in the 2-3 shift valve so that the 2-3 shift valve is changed over from the third speed position to the second speed position. Consequently, the change-over of the 2-3 shift valve from the third speed position to the second speed position is carried out after the second speed position is changed over to the first speed position in the 1-2 shift valve. Therefore, the shift-down from the third speed to the first speed is carried out without shifting to the second speed.

Further in the 2 (second) range, when the vehicle speed drops to a predetermined value, the 2-3 shift valve is changed over from the third speed position to the second speed position and thereafter the 2-3 shift valve has to be held in the second speed position irrespective of the vehicle speed. For that end, the 2-3 shift valve in the 2-range receives the hydraulic pressure for the 2-range in the direction opposed to the working force due to the governor pressure.

On the other hand, since the line pressure is used for the engaging pressure of the frictional engaging device, it is set as a function of the intake throttle position, i.e., the output torque of the engine. However, as above mentioned, when the line pressure is utilized for the third speed position holding pressure in the 2-3 shift valve, this holding pressure varies with the intake throttle position, therefore the vehicle speed in the change-over of the 2-3 shift valve from the third speed position to the second speed position in the 2-range does not reach a predetermined value but unfavorably varies.

Also in the hydraulic pressure control apparatus for use in the automatic transmission for controllably fixing the vehicle speed to the second speed in the 2 (second) range, the engaging pressure needs to be introduced in the frictional engaging device for the second speed irrespective of the position of the 1-2 shift valve in the 2-range Thus, the second speed holding valve is provided in the 2-range which introduces the line pressure as the engaging pressure to the frictional engaging device for the second speed irrespective of operation of the 1-2 shift valve. However, if this second speed holding valve sticks to a position in which the line pressure is introduced to the frictional engaging device for the second speed, the frictional engaging device for L(low) range and the frictional engaging device for the second speed are put into the engaging condition simultaneously in the L-range, thereby causing damage.

Further, when the intake throttle position is almost nil and the up-shift is carried out, if the frictional engaging device for low speed stage and for high speed stage are both of hydraulic pressure system, the release of said device for low speed stage is delayed and the engagement of said device for high speed stage is quickened by the low output torque of the engine. As a result, an overlapping period during which both frictional engaging devices are under the engaged condition may be elongated to produce the negative torque in the frictional engaging device for low speed stage, sometimes causing shocks and uncomfortable blow sounds.

SUMMARY OF THE INVENTION

An object of the present invention is to provide a hydraulic pressure control apparatus for use in an automatic transmission which is to prevent the occurrence of annoying blowing sounds by omitting intermediate speed stages for the shift-down when the throttle position is small.

A further object of the present invention is to provide a hydraulic pressure control apparatus for use in an automatic transmission which carries out the shift-down from the third speed to the first speed without shifting to the second speed in a low throttle position during a period of D-range and in which the vehicle speed in the change-over of the 2-3 shift valve from the third speed position to the second speed position in the 2-range is to be held at a predetermined value irrespective of the intake throttle position.

A still further object of the present invention is to provide a hydraulic pressure control apparatus for use in an automatic transmission for fixing the vehicle speed to the second speed in the 2-range, which prevent frictional engaging devices for the second speed and the L-range from simultaneous engaging conditions due to the sticking of the valves.

Another object of the present invention is to provide a hydraulic pressure control apparatus for use in an automatic transmission which is to restrain shocks and annoying blowing sounds in the up-shift when the intake throttle position is almost nil.

According to the present invention, the hydraulic pressure control apparatus for use in the automatic transmission comprises a governor valve for producing a governor pressure related to the vehicle speed, a throttle valve for producing a throttle pressure related to a throttle position in an intake path, a first shift valve for changing over a first speed stage and a second speed stage on one high speed stage side higher than the first speed stage in relation to the throttle pressure and the governor pressure and having a first output port for producing a line pressure in a high speed stage higher than the second speed stage, a second shift valve having an input port into which the line pressure is introduced from the first output port and a second output port for introducing the line pressure in the input port to a third speed stage engaging device engaged to achieve a third speed stage on one high speed stage side higher than the second speed stage and changing over the second and third speed stages in relation to the throttle pressure and the governor pressure, and the second shift valve having a control port connected to the second output port so that a spring force opposed to the governor pressure is canceled by the line pressure in the second output port.

In the second shift valve, when the governor pressure opposed to the spring force and the throttle pressure is reduced as the vehicle speed is reduced, the second shift valve tends to be changed over from the third speed stage to the second speed stage. However, when it is in the third speed stage, since the line pressure sent from the second output port to the control port cancels the spring force, the governor pressure counterbalances sufficiently the low throttle pressure corresponding to the low throttle position to maintain the third speed stage. When the vehicle speed is further reduced and the first shift valve is changed over from the second speed stage to the first speed stage, the line pressure in the first output port of the first shift valve, and thus the line pressure in the input port of the second shift valve and the second output port, is canceled so that the line pressure in the control port cancelling the spring force is canceled and the second shift valve is changed over to the second speed stage position. In the low throttle position, since the second shift valve maintains the third speed stage until the first shift valve is changed over to the first speed stage, the shiftdown is to be carried out from the third speed stage to the first speed stage by omitting the second speed stage so that the occurrence of blowing sounds accompanying the shift-down from the third speed stage to second speed stage is prevented.

When the throttle position in the intake path is sufficiently large, since a sufficiently high throttle pressure exists even if the spring force is canceled by the line pressure in the control port, the shift-down from the third speed stage to the second speed stage is carried out as soon as the governor pressure is reduced. Also in this case, since the output torque of the engine is sufficiently large and the degree of making the drive torque negative due to the shift-down is small, the occurrence of blowing sounds is prevented.

When the first speed stage is accomplished by the engagement of an one-way clutch, since the one-way clutch engages at the same time as the engaging device in the high speed stage is released and does not produce any negative torque any blowing sounds so that the shift-down is carried out from the third speed stage to the first speed stage without producing any blowing sounds.

In a preferred embodiment, which makes the first, second and third speed stages correspond respectively to the first, second and third speed, the second shift valve as the 2-3 shift valve has a spool for receiving oppositely the throttle pressure and the governor pressure to control the connection between the input port and the second output port and a press member pressed against the spool by a spring producing the spring force, the press member being formed with a step for receiving the line pressure from the control port against the spring force.

The hydraulic pressure control apparatus for use in the automatic transmission according to the present invention comprises:
- line pressure producing means for producing the line pressure related to an intake throttle position;
- a throttle valve for producing the throttle pressure as a hydraulic pressure related to the intake throttle position;
- a governor valve for producing the governor pressure as a hydraulic pressure related to the vehicle speed;
- a 1-2 shift valve for changing over the first speed and the second speed in relation to the throttle pressure and the governor pressure; and
- a 2-3 shift valve for changing over the second speed and the third speed in relation to the throttle pressure and the governor pressure so that the line pressure from the 1-2 shift valve in the second speed position acts as a third speed position holding pressure in the direction of reducing the working force caused by the throttle pressure in the third speed position of the D-range and for receiving the hydraulic pressure for the 2-range in the direction opposed to the working force caused by the governor pressure in the 2-range;
- compensating pressure producing means for producing the compensating pressure related to the intake throttle position; and
- means for exerting the compensating pressure in the 2-range in the direction of counterbalancing the third speed position holding pressure in the 2-3 shift valve.

Thus in the 2-3 shift valve in the 2-range, the compensating pressure related to the intake throttle position acts in the direction of counterbalancing the third speed position holding pressure and the effect of the third speed position holding pressure on the counter action of the 2-range hydraulic pressure and the governor pressure is restrained so that the 2-3 shift valve in the 2-range holds the vehicle speed changed from the third speed position to the second speed position at a predetermined value.

Further, since the compensating pressure is not introduced in the 2-3 shift valve in the D-range, the compensating pressure does not hinder the operation of the shift-down from the third speed to the first speed without shifting to the second speed in the low throttle position during period of the D-range.

Preferably the second range hydraulic pressure is used for the compensating pressure Further preferably a 2-range hydraulic pressure producing means comprises:
- an input port into which the line pressure is introduced from a manual valve in the 2-range;
- an output port for producing the 2-range hydraulic pressure;
- a first control port communicating to the input port;
- a second control port communicating to the output port;
- a drain;
- a spring; and
- a spool for receiving one directional working force from the hydraulic pressure in the first control port and the spring and the other directional working force from the hydraulic pressure in the second control port respectively to connect the output port to the input port or the drain.

The hydraulic pressure control apparatus for use in the automatic transmission according to the present invention comprises:
- a frictional engaging device for the L-range which is supplied with the first engaging pressure in the L-range to be put into-the engaged condition;
- a frictional engaging device for the second speed which is supplied with the second engaging pressure in the second speed to be put into the engaged condition;
- a second speed holding valve having an output port for introducing the second engaging pressure to the second speed frictional engaging device and held at a position where the 2-range input port is connected to the output port in the 2-range; and
- an L-range shift valve having a first output port connected to the L-range frictional engaging device and a second output port connected to the 2-range input port of the second speed holding valve and introducing in the 2-range the second engaging pressure to the second output port and in the L-range the first engaging pressure to the first output port while connecting the second output port to the drain.

In the 2-range, since the L-range shift valve and the second speed holding valve are in the 2-range position, the second engaging pressure is introduced through the second output port of the L-range shift valve, 2-range input port and output port of the second speed holding valve to the second speed frictional engaging device to put thereby the second speed frictional engaging device into the engaging condition.

In the L-range, since the L-range shift valve is in the L-range position, the first engaging pressure is introduced through the first output port of the L-range shift valve to the L-range frictional engaging device to put thereby the L-range frictional engaging device into the engaging condition. Also since at the same time the second output port of the L-range shift valve is connected to the drain, the 2-range input port of the second speed holding valve is connected to the drain through the second output port.

Thus, even if the second speed holding valve would stick to the 2-range position, the 2-range input port of the second speed holding valve is connected to the drain in the L-range and the second engaging pressure is not introduced so that the second speed frictional engaging device is released to prevent the L-range frictional engaging device and the second speed frictional engaging device from the simultaneous engagement.

Preferably, the second engaging pressure is the line pressure and the first engaging pressure is the hydraulic pressure which is lower than the line pressure by a predetermined value.

Preferably, the second speed holding valve has a drive range input and the like pressure is introduced from the 1-2 shift valve to the drive range input port in the second speed or higher of the drive range, and is held in a position of connecting the drive range input port to the output port in-the drive range.

The hydraulic pressure control apparatus for use in the automatic transmission according to the present invention comprises:
- a low speed stage frictional engaging device supplied with a hydraulic medium in the low speed stage to be held in the engaging condition;
- a high speed stage frictional engaging device supplied with the hydraulic medium in the high speed stage to be held in the engaging condition; and
- discharging speed control means for speeding up the discharging speed of the hydraulic medium from the low speed stage frictional engaging device in the up-shift from the low speed stage to the high speed stage when the intake throttle position is almost nil.

While the release of the low speed stage frictional engaging device tends to be delayed by the low output torque of the engine when the intake throttle position is almost nil, such a delay is compensated for by the discharging speed control means which speeds up the discharging speed of the hydraulic medium from the low speed stage frictional engaging device. The low speed stage frictional engaging device is thus released in a proper period so that the occurrence of the negative torque in the low speed stage frictional engaging device due to the increase of overlapping period is avoided and thereby the occurrence of shocks and uncomfortable blow sounds is to be prevented.

In a preferred embodiment, the discharging speed control means comprises:
- an input port communicating to the low speed stage frictional engaging device in the high speed stage;
- a first port connected to the drain through an orifice;
- a second port as the drain;
- a control port communicating to the high speed stage frictional engaging device; and
- a spool having a first position for connecting the input port only to the first port and a second position for connecting the input port to the second port, the spool being displaced toward the second position against a spring when the intake throttle position is almost nil.

Further preferably, the discharging speed control means is a timing valve which has the control port communicating to the high speed stage frictional engaging device and changes over the spool from the first position to the second position when the hydraulic pressure in the control port is above a predetermined value.

For example, the low speed stage is the second speed and the high speed stage is the third speed.

The accompanying drawings, which are incorporated in and constitute part of this specification, illustrate an embodiment of the invention and, together with the description, serve to explain the principles of the invention.

DESCRIPTION OF THE PREFERRED EMBODIMENTS

Figure 1:
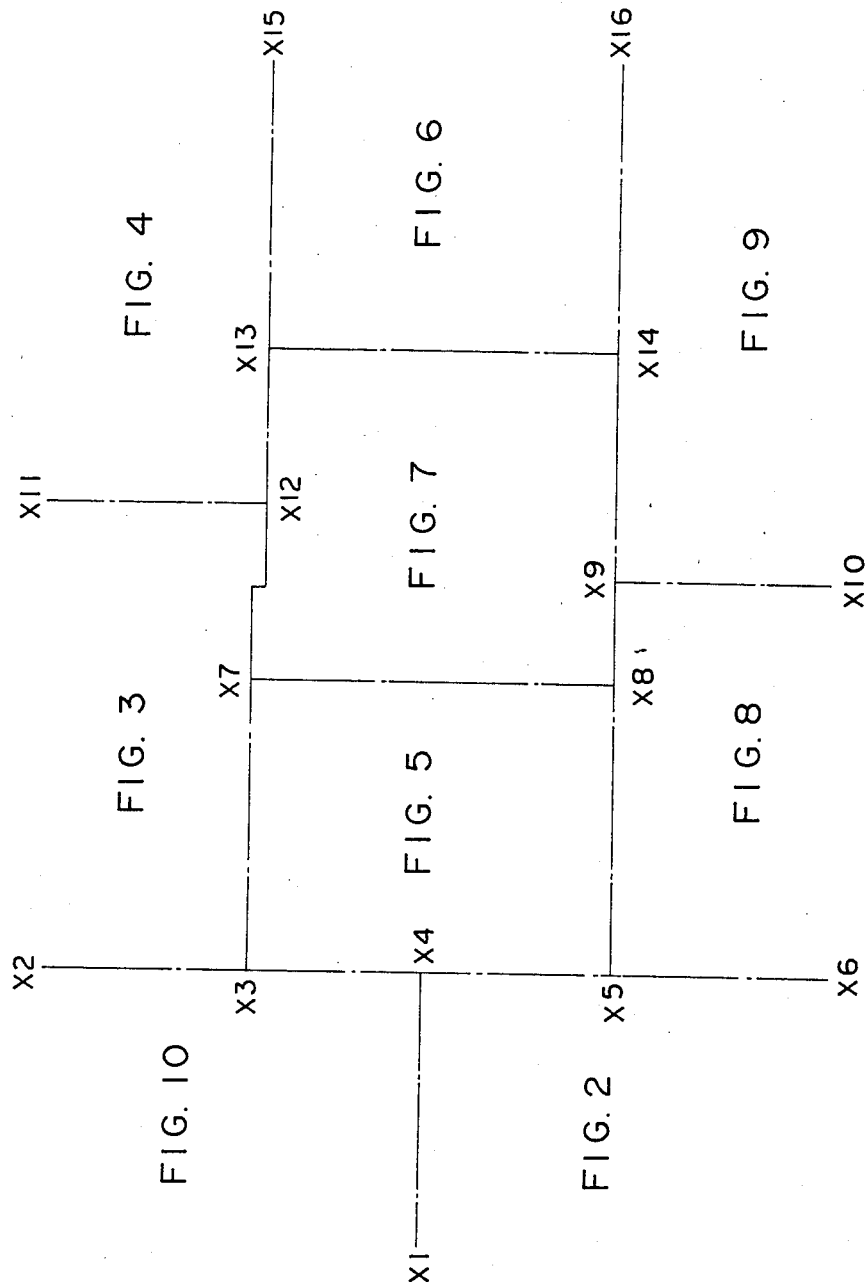
FIG. 1 is a view showing the division in the whole hydraulic pressure control circuit.

FIG. 1 shows the division of the whole hydraulic pressure control unit.

Figure 2:
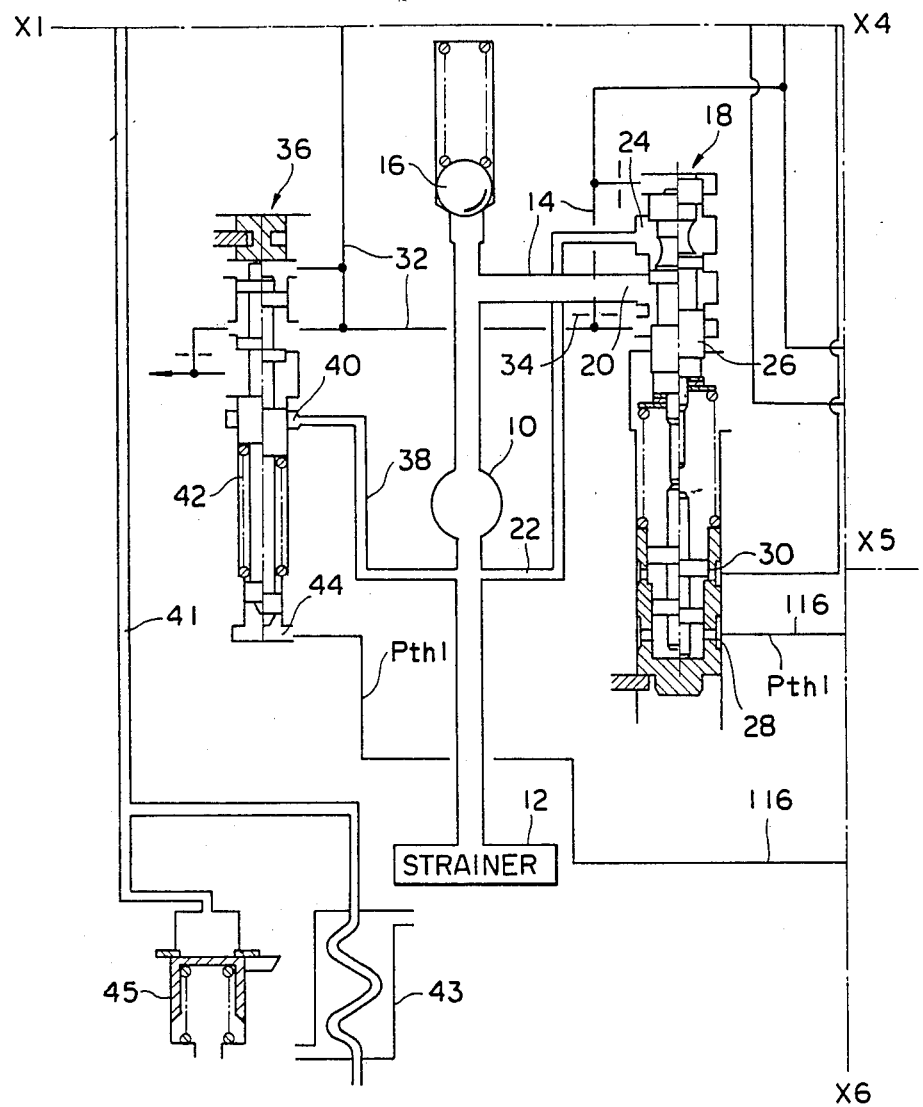
FIGS. 2 to 10 are views corresponding to the respective divisions of FIG. 1.

In FIG. 2, an oil pump 10 driven by an engine pressurizes and discharges oil sucked through a strainer 12. A line pressure oil path 14 is connected to the discharge side of the oil pump 10 and a relief valve 16 regulates the upper limit of the line pressure Pl in the line pressure oil path 14. A primary regulator valve 18 has a port 20 connected to the line pressure oil path 14, a port 24 connected to the intake side of the oil pump 10 through an oil path 22 and a spool 26 for controlling the connection between the ports 20 and 24. A port 28 is supplied with the first throttle pressure Pth1 which is a first increasing function of the throttle position in the intake path. As the first throttle pressure Pth1 is increased, only outflow from the port 20 to the port 24 is decreased and the line pressure Pl becomes the increasing function of the first throttle pressure Pth1. A port 30 is supplied with the line pressure Pl from a manual valve in the R-range or 2-range and thereby the line pressure Pl in the port 20 during the R and 2-ranges is determined. An oil path 32 is connected to the line pressure oil path 14 through an orifice 34, and a secondary regulator valve 36 has a port 40 connected to the suction side of the oil pump 10 through an oil path 38, a spring 42 and a port 44 supplied with the first throttle pressure Pth1 controls the hydraulic pressure in the oil path 32 by controlling the discharging flow of oil from the oil path 32 to the port 40 in relation to the spring 42 and the first throttle pressure Pth1. An oil path 41 is connected to an oil cooler 43 and a relief valve 45 restrains the upper limit of the hydraulic pressure in the oil path 41.

Figure 3:
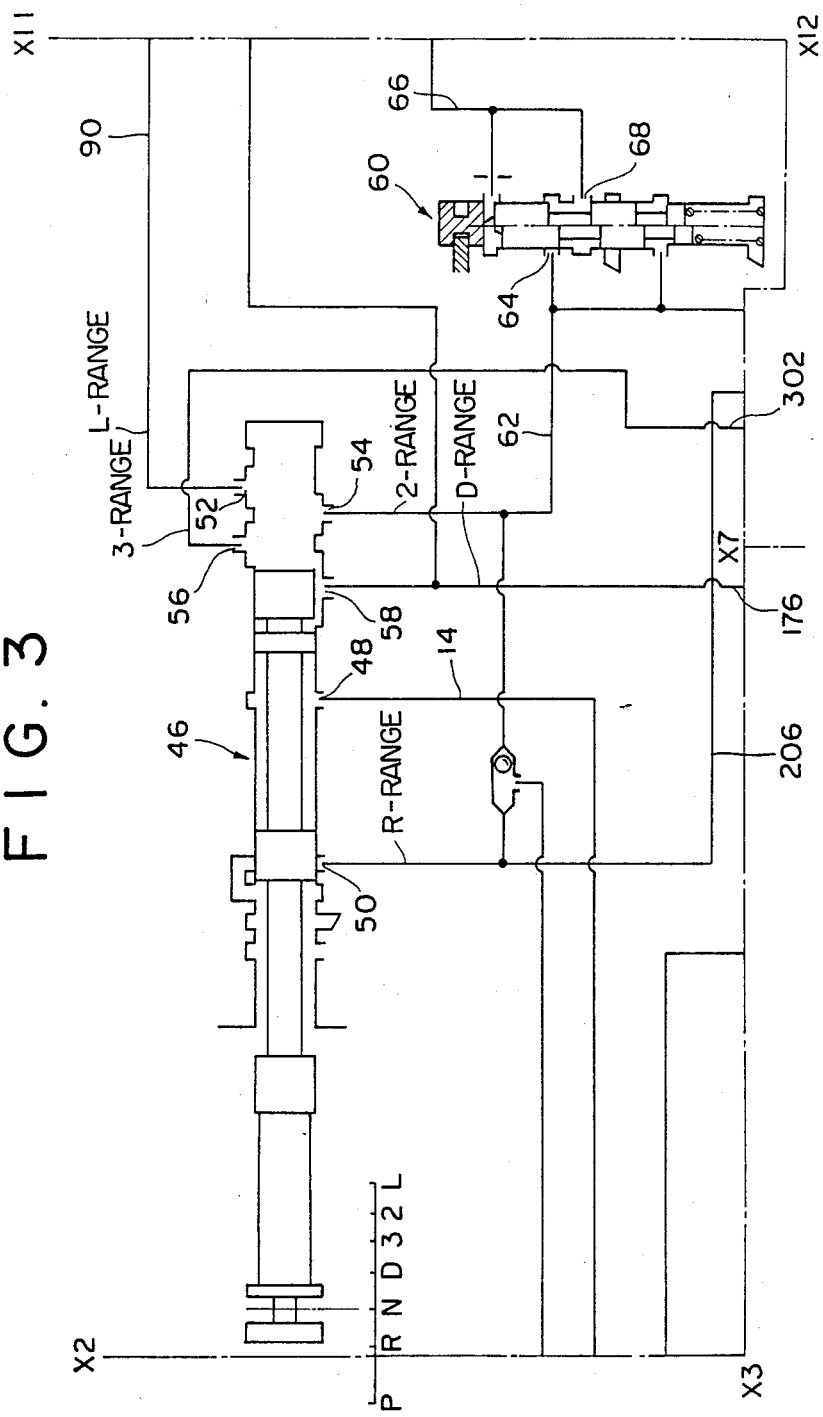

In FIG. 3, a manual valve 46 has an input port 48 connected to the oil path 14, an output port 50 connected to the input port 48 in the R-range, an output port 52 connected to the input port 48 in the L-range, an output port 54 connected to the input port 48 in the L, 2-ranges, an output port 56 connected to the input port 48 in the L, 2, 3-ranges and an output port 58 connected to the input port 48 in the L, 2, 3, D-ranges. A modulator valve 60 for the 2-range has an input port 64 connected to the port 54 through an oil path 62 and an output port 68 connected to an oil path 66 and produces the modulator pressure appropriately lower than the line pressure Pl in the output port 68.

Figure 4:
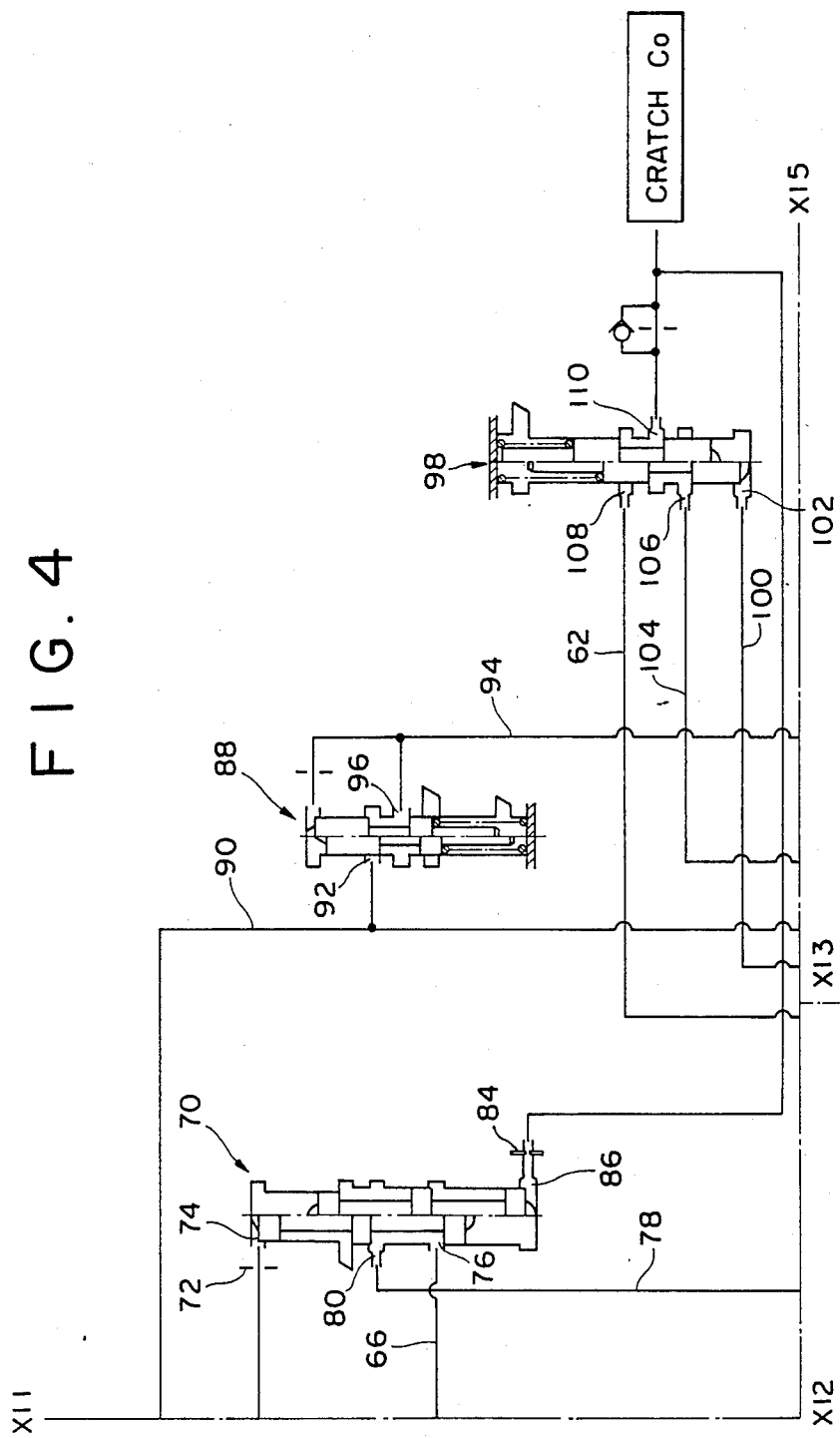

In FIG. 4, a D-2 timing valve 70 has a port 74 connected to the port 58 through an orifice 72 and supplied with the line pressure Pl in a period of the forward travelling range, an input port 76 connected to the oil path 66 and supplied with the modulator pressure in the modulator valve 60 in the L,2-ranges, an output port 80 connected to the oil path 78 and a port 86 connected through an orifice 84 to a hydraulic pressure cylinder of a clutch Co and introduces the modulator pressure in the input port 76 to the output port 80 after the clutch Co is put into the engaged condition when the D-range is shifted to the L or 2-range. The oil path 78 is connected to a 2-3 shift valve which will be later described and is changed over from the high speed side position to the low speed side position by the modulator pressure from the oil path 78. Also since the clutch Co is one which is engaged to ensure first to third speed engine brakes, when the D-range is shifted to the L or 2-range, the third speed is held after the clutch Co is engaged until the vehicle speed is properly reduced to thereby prevent the fourth speed from being changed directly to the second speed. A modulator valve 88 for the L-range has an input port 92 connected to the port 52 through an oil path 90 and an output port 96 connected to an oil path 94 to produce a predetermined modulator pressure in the output port 96 in the L-range. A control valve 98 has a port 102 supplied with the line pressure Pl from the 2-3 shift valve through an oil path 100 when the 2-3 shift valve is in the low speed side position, a port 106 supplied with the line pressure Pl from the 3-4 shift valve through an oil path 104 when the 3-4 shift valve is in the low speed side position, a port 108 connected to the port 54 in the manual valve 46 through the oil path 62 and an output port 110 connected to a hydraulic pressure cylinder of the clutch Co. In the 3-range, the line pressure Pl is sent from the 3-4 shift valve to the port 106 and in the L, 2-ranges the line pressure Pl is sent from the manual valve 46 to the port 108. Hence, the line pressure Pl in the port 106 or 108 is introduced to an output port 110 in the 3, 2, L-ranges to put the clutch Co for an engine brake into the engaged condition.

Figure 5:
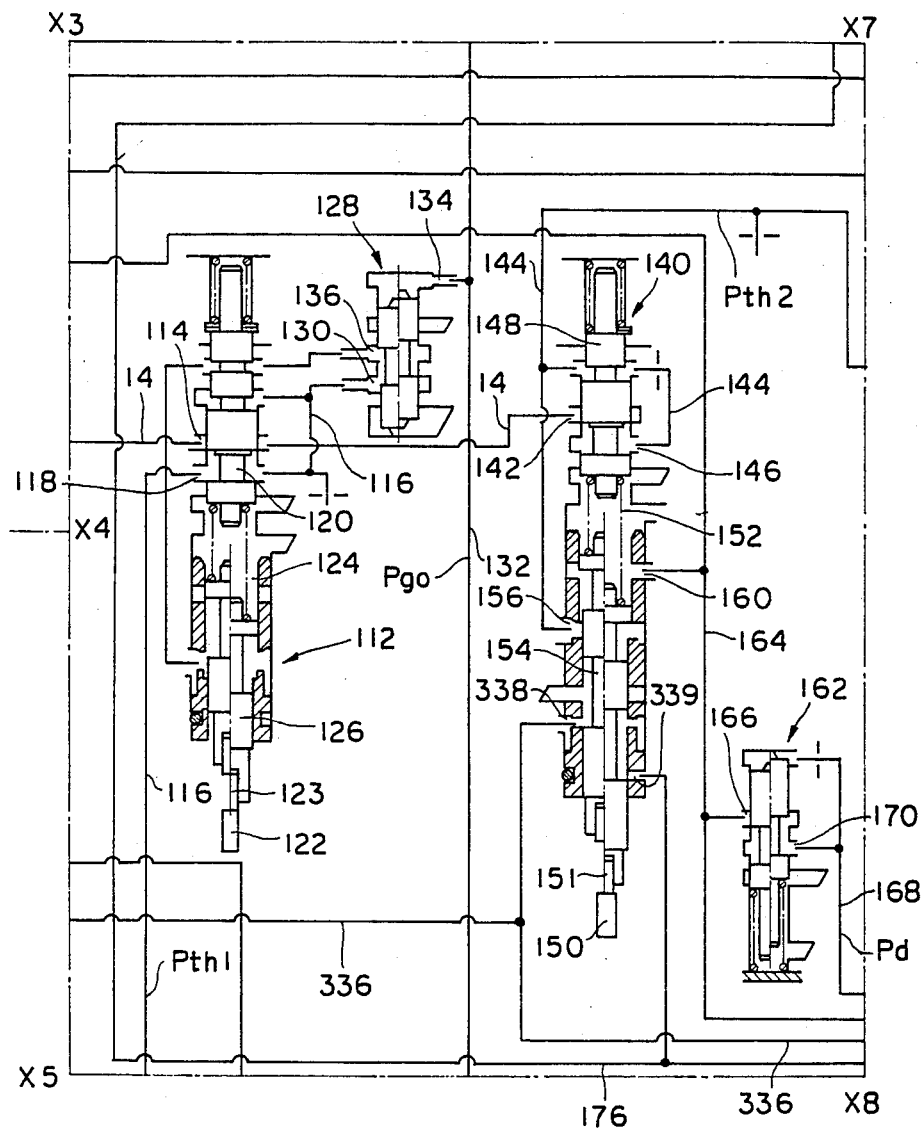

In FIG. 5, a first throttle valve 112 has an input port 114 connected to the line pressure oil path 14, an output port 118 connected to an oil path 116 to produce the first throttle pressure Pth1, a spool 120 for controlling the flow path area of the input port 114 to produce the throttle pressure Pth1 corresponding to the working force of a spring 124, a throttle cam 122 interlocked with a throttle valve in the intake path and a spool 126 operated by the throttle cam 122 through a roller 123 to urge the spool 120 through the spring 124. Since the more the throttle valve position in the intake path is increased, the more the sectional area of flow in the input port 114 is increased, and the first throttle pressure Pth1 is the increasing function of the throttle position A cut-back valve 128 has a port 130 supplied with the first throttle pressure Pth1, a port 134 supplied with the governor pressure Pgo through an oil path 132 and a port 136 for producing the control pressure for the first throttle valve 112 to limit properly the first throttle pressure Pth1 with respect to the governor pressure Pgo and prevent the oil pump 10 from power loss. A second throttle valve 140 has an input port 142 connected to the line pressure oil path 14, an output port 146 connected to an oil path 144 to produce the second throttle pressure Pth2, a spool 148 for controlling the sectional area of flow path in the input port 142 to produce the throttle pressure Pth2 corresponding to the working force o a spring 152, a throttle cam 150 interlocked with the throttle valve in the intake path and a down-shift plug 154 operated by the throttle cam 150 through a roller 151 to urge the spool 148 through the spring 152. Since the more the throttle valve position in the intake path is increased, the more the sectional area of flow in the input port 142 is increased, and the second throttle pressure Pth2 is the increasing function of the throttle position When the throttle valve in the intake path is almost fully opened, i.e., in the kick-down, the down-shift plug 154 introduces the line pressure Pl from a port 156 to a port 160. A detent regulator valve 162 has an input port 166 connected to the port 160 through an oil path 164 to produce the predetermined detent pressure in an output port 170 connected to an oil path 168. When the throttle position reaches 85% or more, the down-shift plug 154 connects the oil path 144 to the port 160 to which the second throttle pressure Pth2 is introduced.

Figure 6:
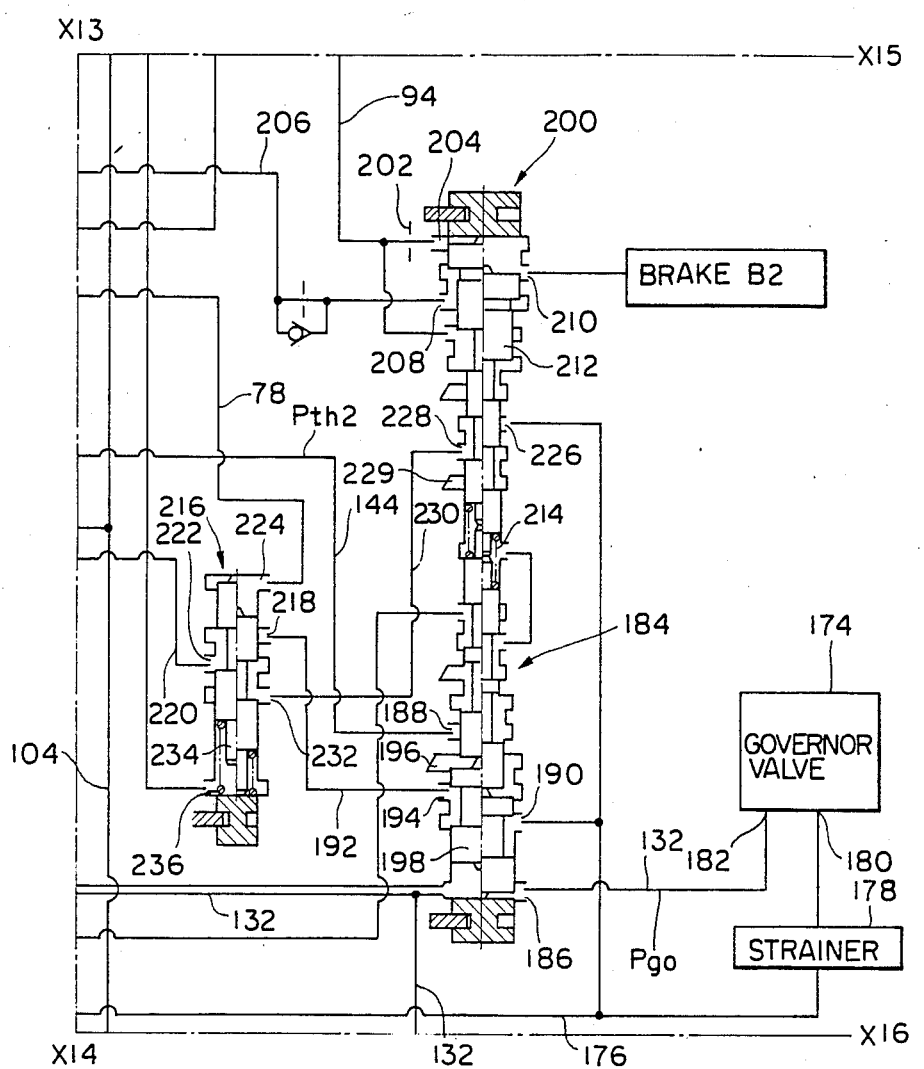

In FIG. 6, a governor valve 174 has an input port 180 supplied with the line pressure Pl through a strainer 178 from an oil path 176 connected to the port 58 of the manual valve 46 (the line pressure Pl is introduced to the port 58 in the forward travelling range) to produce the governor pressure Pgo related to the vehicle speed in an output port 182 connected to the oil path 132.

A 1-2 shift valve 184 has a port 186 supplied with the governor pressure Pgo through the oil path 132, a port 188 supplied with the second throttle pressure Pth2 through the oil path 144, an input port 190 connected to the oil path 176, an output port 194 connected to an oil path 192 and a spool 198 for selectively connecting the output port 194 to the input port 190 or a drain 196. The spool 198 interrupts the communication between the input port 190 and the output port 194 in the low speed side position, i.e., the first speed position to connect the output port 194 to the drain 196 and to the input port 190 in the high speed side position, i.e., at least the second speed position. A shift valve 200 for the L-range has an input port 204 connected to the oil path 94 through an orifice 202, an input port 208 connected through an oil path 206 to the port 50 in the manual valve 46 (to which the line pressure Pl is introduced in the R-range), an output port 210 connected to a hydraulic pressure cylinder of a brake B2 engaged in the L and R ranges and a spool 212 for connecting the output port 210 to either the input port 208 or 210. As a result, in the L-range and the R-range the hydraulic pressure from the respective input ports 204, 208 is introduced through the output port 210 to the brake B2 to put the brake B2 into the engaged condition. In the L-range, the spool 212 moves toward the 1-2 shift valve 184 to hold the spool 190 in the 1-2 shift valve 184 at the low speed side position. Further, the first speed in the D-range is achieved by the engagement of a one-way clutch parallel to the brake B2 and the spool 212 receives a force directed from a spring 214 to the input port 204.

A second speed holding valve 216 has an input port 218 connected to the oil path 192, an output port 222 connected to an oil path 220, a port 224 connected to the oil path 78, an input port 232 connected to an oil path 230 supplied with the line pressure Pl in the oil path 176 (the oil path 176 is the line pressure Pl in the D, 3, 2, L-ranges and the spool 212 connects a port 226 to a port 228 in the D, 3, 2-ranges and a port 226 to a drain 229 in the L-range) through the ports 226, 228 of the L-range shift valve 184 and a spool 234 for connecting the output port 222 to the input port 218 or 232. The spool 234 is urged toward the port 224 by a spring 236 in the D, 3-ranges (that is, when the port 224 is free from the hydraulic pressure), and when the 1-2 shift valve 184 occupies the high speed side position, the line pressure Pl in the input port 218 is introduced to the output port 222. Also, the spool 234 in the 2-range is moved toward the spring 236 by the hydraulic pressure in the port 224 to introduce the line pressure Pl in the input port 218 to the output port 222. The oil path 220 is connected to a 2-3 shift valve which will be described later. The 2-3 shift valve in the 2-range is held at the low speed side position to introduce the line pressure Pl to the clutch Co and a brake B1 for the second speed, so that the 2-3 shift valve in the 2-range is held at the second speed by the second speed holding valve 216 and the spool 212 irrespective of the vehicle speed and the throttle position.

Figure 7:
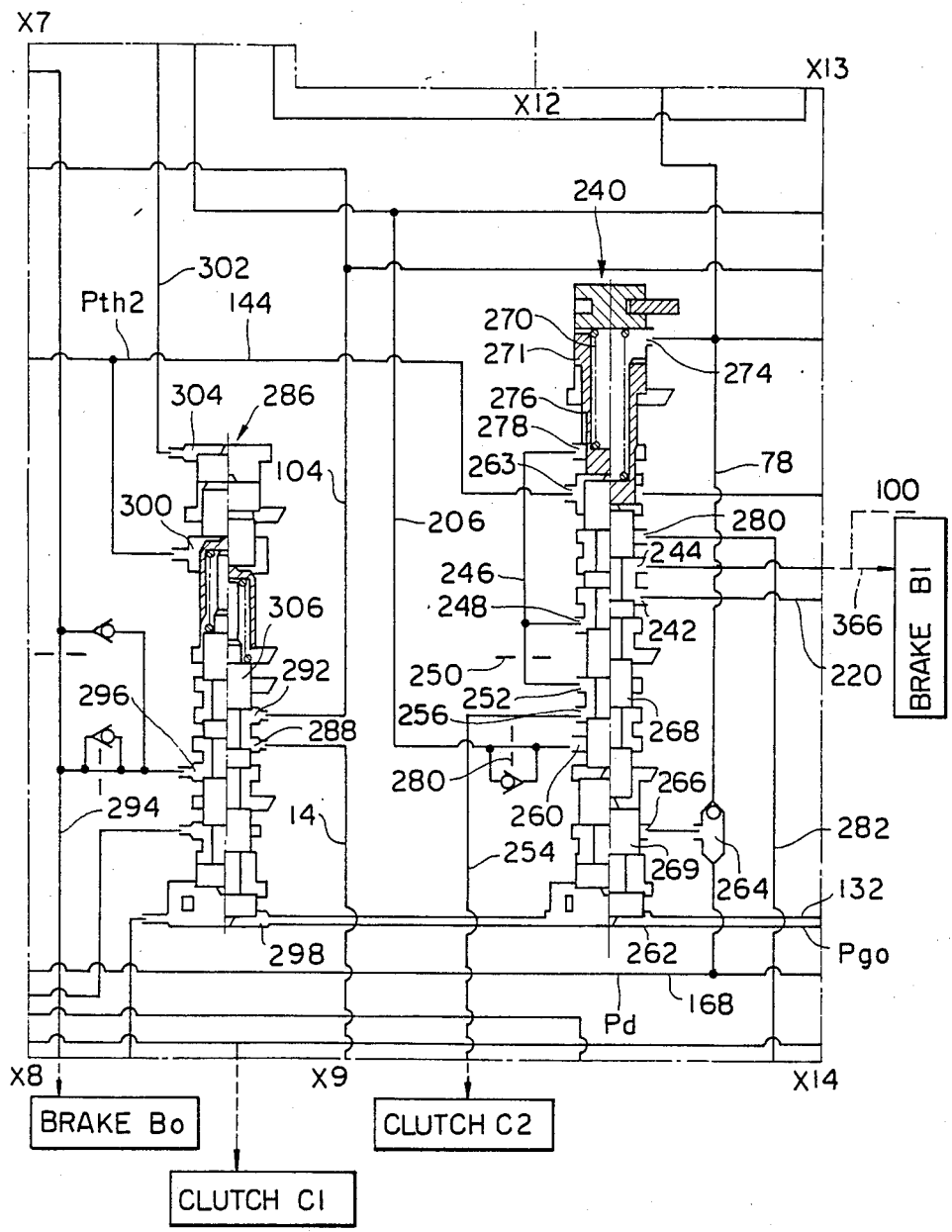

In FIG. 7, a 2-3 shift valve 240 has an input port 242 connected to the oil path 220, a low speed side output port 244 connected to the oil path 100, a high speed side output port 248 connected to an oil path 246, a port 252 connected to the oil path 246 through an orifice 250, a port 256 connected to an oil path 254 connected to a clutch C2 to be engaged in the third and fourth speeds, a port 260 connected to the R-range port 50 of the manual valve 46 through the oil path 206, a port 262 connected to the oil path 132 to be supplied with the governor pressure Pgo, a port 263 supplied with the second throttle pressure Pth2 through the oil path 144, a port 266 supplied with the modulator pressure in the oil path 78 during the 2-range or the detent pressure Pd in the oil path 168 through a shuttle valve 264, a spool 268 for connecting the input port 242 to the output port 244 or 248, a spool 269 urged toward the spool 268 by the governor pressure Pgo in the port 262, a press member 271 pressed by a spring 270 toward the spool 268, a port 274 making the press member 271 exert the hydraulic pressure in the oil path 78 toward the spool 268 and a port 278 for exerting the hydraulic pressure in the oil path 246 to a step portion 276 of the press member 271 to urge the press member 271 in the opposite direction to the spring force of the spring 270.

When the second throttle pressure Pth2 is relatively large, compared to the governor pressure Pgo and the spool 268 is in the second speed position, the input port 242 is connected to the output port 244. As a result, the line pressure is sent to the hydraulic pressure cylinder of the second speed brake B1 to put the brake B1 into the engaged condition. Also, in this case, since the port 256 is connected to the port 260 and the oil path 206 is connected to the drain in the manual valve 46 during the D-range, the clutch C2 for the third and fourth speeds is held in the released condition.

When the governor pressure Pgo is relatively large, compared to the second throttle pressure Pth2 and the spool 268 is in the third speed position, the input port 242 is connected to the output port 248 and the port 252 is connected to the port 256. As a result, the line pressure Pl is supplied to the clutch C2 for the third and fourth speeds to put the clutch C2 into the engaged condition. The rate of supplying the line pressure Pl to the clutch C2 is controlled by the orifice 250. Also in this case, the output port 244 is connected to the drain of the 2-3 timing valve for the brake B1 through a port 280 and an oil path 282 to put the brake B1 for the second speed into the released condition.

Since the port 262 is free from the governor pressure Pgo in the R-range, the port 260 is connected to the port 256. Thus, the line pressure Pl in the oil path 206 is supplied to the clutch C2 for the R-range through the ports 260, 256. The rate of supplying the line pressure Pl to the clutch C2 shifted to the R-range is regulated by an orifice 280 in front of the port 260.

A 3-4 shift valve 286 has an input port 288 connected to the oil path 176 supplied with the line pressure Pl in the D-range, a low speed side output port 292 connected to the oil path 104, a high speed side output port 296 connected to an oil path 294, a port 298 connected to the oil path 132 to be supplied with the governor pressure Pgo, a port 300 connected to the oil path 144 to be supplied with the second throttle pressure Pth2, a port 304 supplied with the line pressure Pl from the port 56 in the manual valve 46 through an oil path 302 in the 3-range and a spool 306 for connecting the input port 288 to the output port 292 or 296.

When the second throttle pressure Pth2 is relatively large, compared to the governor pressure Pgo and the spool 306 is in the low speed side position, the input port 288 is connected to the output port 292 and the line pressure Pl is introduced to the port 106 in the control valve 98 through the oil path 104. When the governor pressure Pgo is relatively large, compared to the second throttle pressure Pth2 and the spool 306 is in the high speed side position, the input port 288 is connected to the output port 296 to put a fourth speed brake Bo into the engaged condition.

Figure 8:
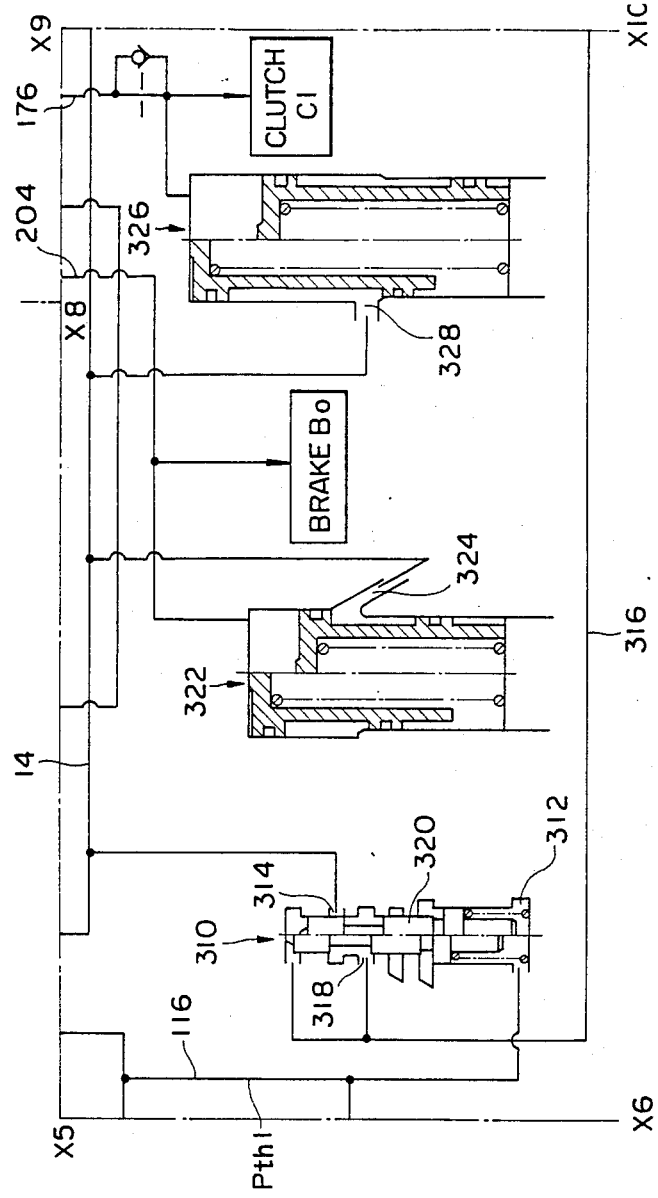

In FIG. 8, a controlling valve 310 for an accumulator has a port 312 connected to the oil path 116 to be supplied with the first throttle pressure Pth1, an input port 314 connected to the oil path 14 to be supplied with the line pressure Pl, an output port 318 connected to an oil path 316 and a spool 320 for controlling the sectional area of flow in the input port 314 and the output port 318 in relation to the second throttle pressure Pth2. The brake Bo is supplied with the line pressure Pl from the 3-4 shift valve 286 through the oil path 204. An accumulator 322 has a port 324 supplied with the line pressure Pl from the oil path 14 to control the rise and fall of the hydraulic pressure in the brake Bo. The clutch C1 is connected to the oil path 176 and an accumulator 326 has a port 328 supplied with the line pressure Pl from the oil path 14 to control the rise and fall of the hydraulic pressure in the clutch C1.

Figure 9:
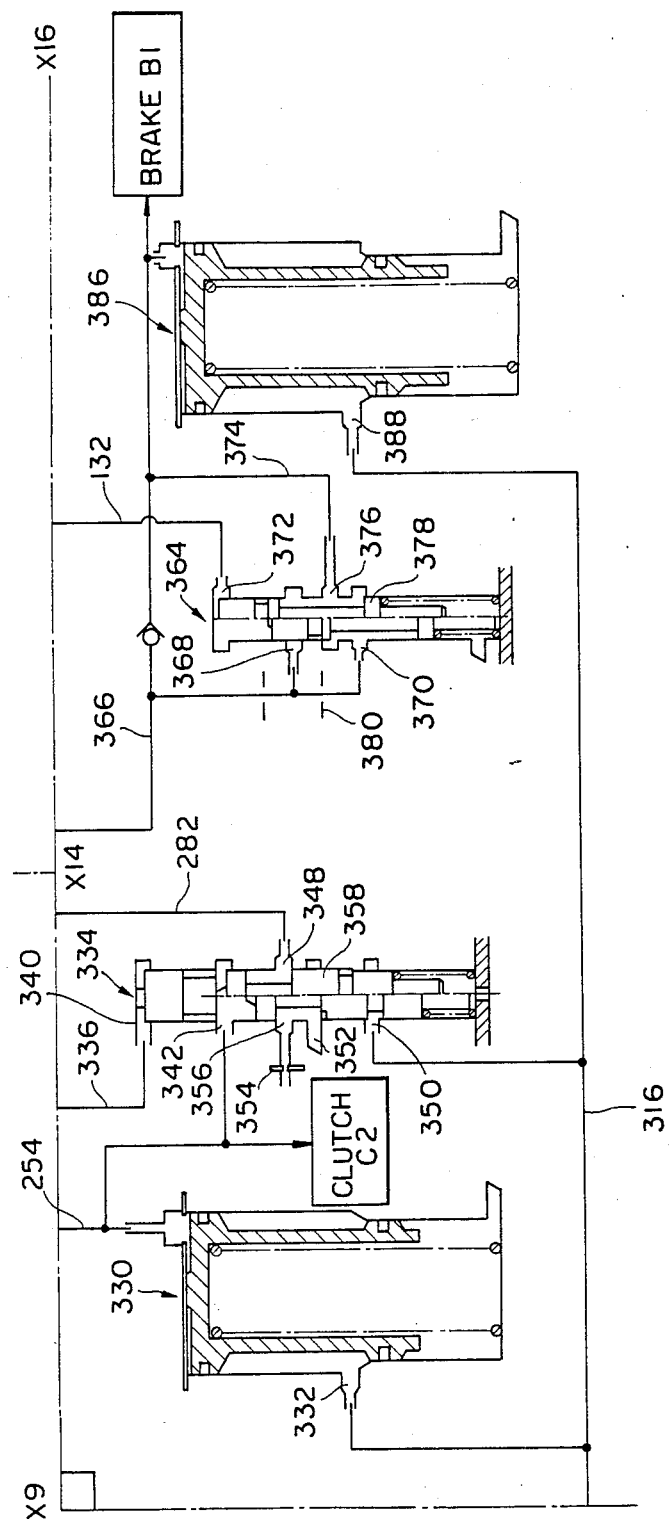

In FIG. 9, the clutch C2 is connected to the port 256 in the 2-3 shift valve 240 through the oil path 254 and an accumulator 330 has a port 332 supplied with the control pressure from the oil path 316 to control the rise and fall of the hydraulic pressure in the clutch C2.

A 2-3 timing valve 334 has a port 340 connected to a port 338 in the second throttle valve 140 through an oil path 336 (the line pressure Pl in a port 339 is introduced to the port 338 in relation to the position of the plug 154), a port 342 connected to the oil path 254, a port 348 connected to the port 280 in the 2-3 shift valve 240 through the oil path 282, a port 350 connected to the oil path 316, a drain 352, a port 356 connected to the drain through an orifice 354 and a spool 358 for controlling the connection between the port 348 and the drain 352. In the shift-up from the second speed to the third speed, the port 348 is connected to the second speed brake B1 through the oil path 282 and the ports 280, 244 in the 2-3 shift valve 240. However, when the hydraulic pressure in the third speed clutch C2 is still low, the communication between the port 348 and the drain 352 is interrupted, and the oil in the brake B1 is discharged gently through the orifice 354. When the hydraulic pressure in the clutch C2 becomes sufficiently high, the port 348 is connected to the drain 352 so that the oil in the brake B1 is quickly discharged.

A 3-2 kick-down control valve 364 has ports 368, 370 connected to the port 244 in the 2-3 shift valve 240 through an oil path 366, a port 372 supplied with the governor pressure Pgo through the oil path 132, a port 376 connected to the brake B1 through an oil path 374 and a spool 378 for connecting the port 376 to the port 368 or 370. Since the governor pressure Pgo in the port 372 is low in the usual shift-down to the second speed, the line pressure Pl in the oil path 366 is sent quickly to the brake B1 through the ports 368, 376. However, in the shift-down to the second speed by the kick-down, when the governor pressure Pgo in the port 372 is high, the line pressure Pl is sent to the brake B1 through the ports 370, 376, i.e., through an orifice 380, so that the engagement of the brake B1 is delayed As a result, direct shift-down from the fourth speed to the second speed is avoided and the shift-down to the second speed through the third speed is carried out.

An accumulator 386 has a port 388 connected to the oil path 316 to control the rise and fall of the hydraulic pressure in the brake B1.

Figure 10:
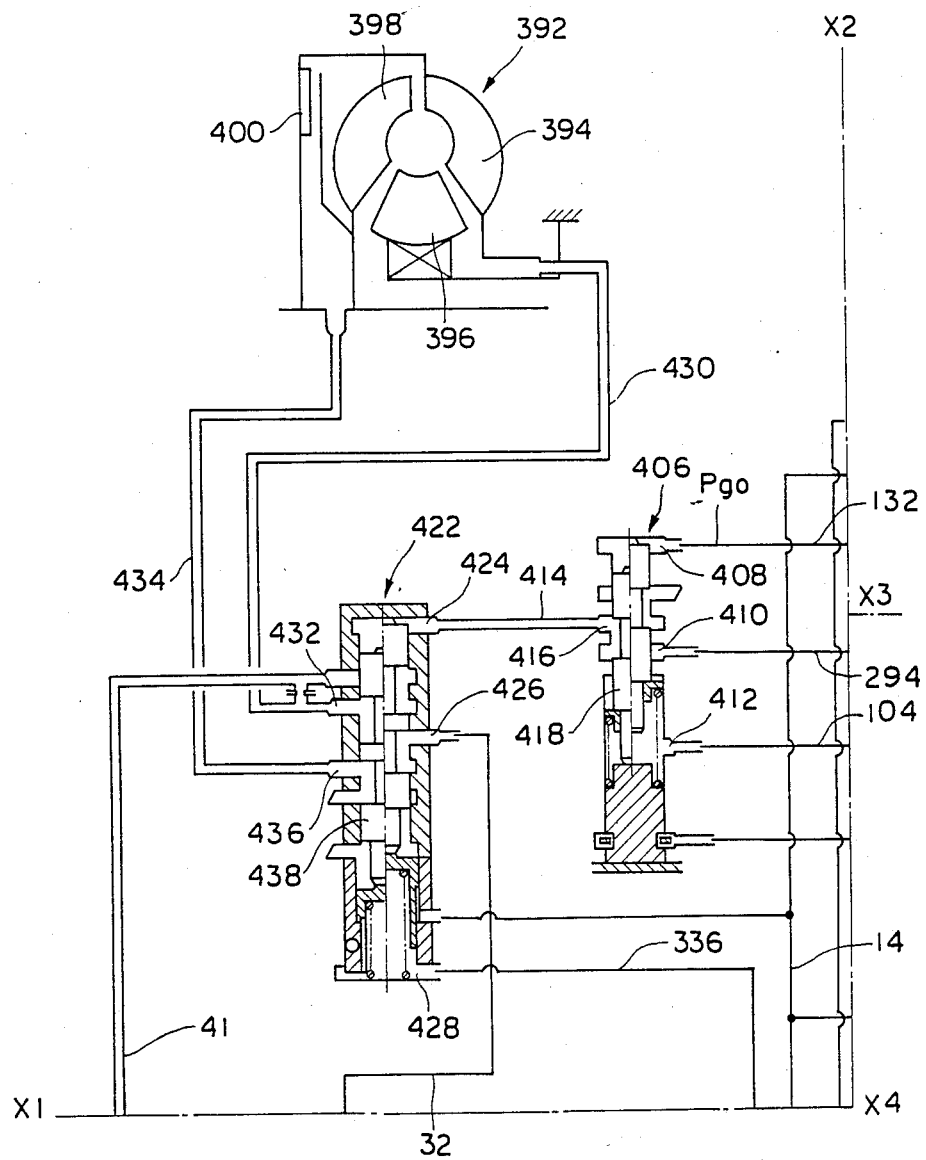

In FIG. 10, a fluid torque converter 392 for the automatic transmission has a pump impeller 394 connected to a crankshaft of the engine, a stator 396 and a turbine runner 398 coupled with an input shaft of a gear assembly. A lock-up clutch 400 is provided parallel to the fluid torque converter 392.

A lock-up signal valve 406 has a port 408 supplied with the governor pressure Pgo through the oil path 132, an input port 410 connected to the high speed side output port 296 in the 3-4 shift valve 286 through the oil path 294, a port 412 connected to the low speed side output port 292 in the 3-4 shift valve 286 through the oil path 104, a port 416 connected to an oil path 414 and a spool 418 for controlling the communication between the ports 410 and 416. When the 3-4 shift valve 286 is in the high speed side position and the governor pressure Pgo exceeds a predetermined value, the line pressure Pl in the port 410 is introduced to the port 416.

A relay valve 422 has a port 424 connected to the oil path 414, an input port 426 connected to the oil path 32, a port 428 connected to the port 338 in the second throttle valve 140 through the oil path 336, a port 432 connected to the engaging side of the lock-up clutch 400 through an oil path 430, a port 436 connected to the releasing side of the lock-up clutch 400 through an oil path 434 and a spool 438 for connecting the port 426 to the port 432 or 436. When the hydraulic pressure is sent to the port 424, the port 426 is connected to the port 432 to put the lock-up clutch 400 into the engaged condition.

Again referring to FIG. 7 will be described the principal parts of the embodiment.

When the automatic transmission is in the third speed, the line pressure Pl is sent to the port 242 through the oil path 220 and the line pressure Pl in the port 242 is supplied to the clutch C2 through the ports 248, 252, 256 and the oil path 254 to put the clutch C2 into the engaged condition. Also, the hydraulic pressure introduced into the port 278 through the oil path 246 acts on the step portion 276 of the press member 271 to separate the press member 271 from the spool 268 against the spring 270 and cancel the spring force of the spring 270.

When the shift-down from the third speed is carried out when the throttle valve in the intake path is almost fully closed, as mentioned above, since the spring force of the spring 270 is canceled in the third speed, the governor pressure Pgo opposes to the sufficiently low second throttle pressure Pth2 in the port 263 in spite of the reduction of the vehicle speed and is maintained at the third speed until the vehicle speed is sufficiently reduced. When the vehicle speed is reduced further, the 1-2 shift valve 184 is changed over from the high-speed side to the low speed side position before the 2-3 shift valve 240 comes to the low speed side position so that the line pressure Pl in the input port 242, thus in the port 278 disappears. As a result, since the press member 271 urges the spool 268 toward the port 262 by the spring force of the spring 270, the 263 shift valve 240 takes the low speed side position. Thus when the second throttle pressure Pth2 is low, since the 2-3 shift valve 240 is changed over to the low speed side position after the 1-2 shift valve 184 is changed over to the low speed side position the shift-down from the third speed to the first speed without shifting to the second speed is carried out so that shocks accompanying the shift-down from the third speed to the second speed is to be prevented.

When the throttle valve position in the intake path is sufficiently large, the second throttle pressure Pth2 in the port 263 is sufficiently high. Though the spring force of the spring 270 is canceled, the second throttle pressure Pth2 locates the 2-3 shift valve 240 at the low speed side position as the governor pressure Pgo in the port 262 is reduced, and the shift-down from the third speed to the second speed is carried out. In this case, since the output torque of the engine is sufficiently large, the drive torque will not become negative in the shift-down and no problems of shocks are encountered.

In the embodiment, the shift-down from the third speed to the first speed has been described, however, the present invention is to be applied to the shift-down from the fourth speed direct to the second speed without shifting to the third speed.

Now will be described further principal parts of the embodiment.

Figure 11:
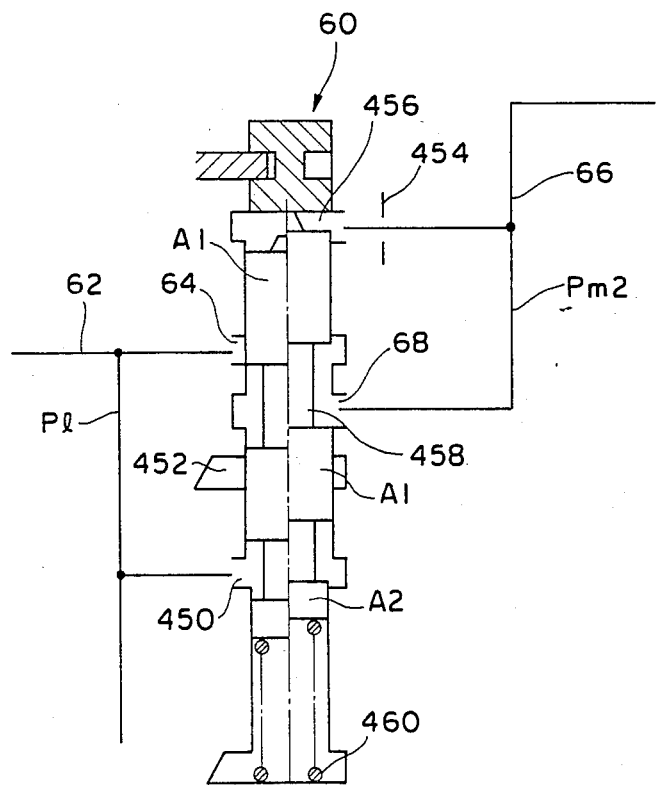
FIG. 11 is a detailed view showing a 2-range modulator valve.

FIG. 11 is a detailed view showing the modulator valve 60 for the 2-range shown in FIG. 3. The 2-range modulator valve 60 has the input port 64 introduced the line pressure Pl through the oil path 62 in the 2 and L-ranges, the output port 68 communicating to the oil path 66 to produce the second modulator pressure Pm2 as the hydraulic pressure for the 2-range, a first control port 450 communicating to the oil path 62, a drain 452, a second control port 456 communicating to the oil path 66 through an orifice 454, a spool 458 for connecting the output port 68 to the input port 64 or the drain 452 and a spring 460 for urging the spool 458 toward the first control port 456. The spool 458 has three lands. The area A1 of two lands at the second control port 456 side is larger than the area A2 of one land at the spring 460 side (A1>A2). Thus, the spool 458 receives upward forces from the line pressure Pl in the first control port 450 and the spring 460 and a downward force from the modulator pressure Pm2 in the second control port 456. When the upward force exceeds the downward force, the output port 68 communicates to the input port 64 to increase Pm2, and when the upward force is less than the downward force, the output port 68 communicates to the drain 452 to reduce Pm2. As described with respect to the primary regulator valve 18 in FIG. 2, since the line pressure Pl is the increasing function of the first throttle pressure Pth1, thus the intake throttle position, the modulator pressure Pm2 is the increasing function of the line pressure Pl in the first control port 450 and at the same time being the increasing function of the intake throttle position.

Such modulator pressure Pm2 is sent to the control ports 266, 274 of the 2-3 shift valve 240 in FIG. 7 through the D-2 timing valve 70 and the oil path 78 in FIG. 4 when the clutch Co supplied with the engaging hydraulic pressure to produce the first or third speed engine brake is put into the engaged condition.

Now will be described principal operations of the 2-3 shift valve 240 in FIG. 7.

In the third speed during the D-range, the spool 268 is in the third speed position to produce the line pressure Pl in the output port 248. This line pressure Pl acts on the step portion 276 through the control port 278 to reduce the downward force of the spool 268, i.e., force in the shift-down direction. In the large intake throttle position, the second throttle pressure Pth2 is also so large that the spool 268 is varied from the third speed position to the second speed position by the second throttle pressure Pth2 to produce the second speed as the governor pressure Pgo is reduced. In the small intake throttle position, however, the second throttle pressure Pth2 becomes also so small that the spool 268 is still held in the third speed position by the aid of the line pressure Pl in the step portion 276 even after the governor pressure Pgo is sufficiently reduced, and thus the third speed is maintained. Eventually, in the low throttle position, the 1-2 shift valve 184 is completely changed over from the second speed position to the first speed position before the 2-3 shift valve 240 is changed over from the third speed position to the second speed position, thereby the line pressure Pl in the input port 242, output port 248 and control port 278 in the 2-3 shift valve 240 disappears and the 2-3 shift valve 240 is changed over from the third speed position to the second speed position. That is, the shift-down from the third speed to the first speed is carried out without shifting to the second speed.

In the 2-range, the modulator pressure Pm2 is introduced to the control port 266 in the 2-3 shift valve 240 to oppose to the governor pressure Pgo in the port 262. When the governor pressure Pgo is thus reduced properly, the 2-3 shift valve is changed over from the third speed position to the second speed position by the modulator pressure Pm2 in the control port 266. After said valve is changed over once to the second speed position, the working area of the land receiving the governor pressure Pgo is reduced so that the 2-3 shift valve 240 is held at the second speed position irrespective of the vehicle speed by the modulator pressure Pm2 in the control port 266.

In the change-over of the 2-3 shift valve 240 from the third speed to the second speed in the 2-range, if the modulator control pressure Pm2 only were opposed against the governor pressure Pgo in this change-over, thus the vehicle speed at which the downshift from the third speed to the second speed to be caused by the shifting of the manual valve 46 to the 2-range would vary unfavorably in relation to the intake throttle position. However, according to the present invention, the modulator pressure Pm2 related to the intake throttle position is introduced to the control port 274 in the 2-3 shift valve 240 in the 2-range and this Pm2 acts on the end face of the spool 271 to counterbalance the line pressure Pl acting on the step portion 276. Therefore, the variation of the line pressure due to the intake throttle position is canceled, and therefore the vehicle speed in the change-over of the 2-3 shift valve 240 from the third speed position to the second speed position at which the 2-range occurs is isolated from the change related to the intake throttle position, and therefore the curbing on the downshifting from the third speed to the second speed to be caused by the shifting of the manual valve 46 to the 2-range is released at a substantially constant vehicle speed regardless of the intake throttle position.

Now will be described further principal parts of the embodiment.

In the second speed holding valve 216 in FIG. 6, since the 2-range modulator pressure Pm2 is not introduced to the control port 224 through the oil path 78 in the D-range, the spool 234 is pressed by the spring 236 against the control port 224 and the output port 222 is connected to the D-range input port 218. When the 1-2 shift valve 184 is thus in the second speed position, the line pressure Pl is introduced to the D-range input port 218 from the port 194 in the 1-2 shift valve 184 and sent to the 2-3 shift valve 240 through the output port 222 and the oil path 220. As a result, when the 2-3 shift valve 240 is in the second speed position, the line pressure Pl is introduced to the brake B1 as the second speed frictional engaging device to put the brake B1 into the engaged condition.

In the 2-range, after the clutch Co as the frictional engaging device for the engine brake is put into the engaged condition, the modulator pressure Pm2 is introduced to the control port 224 in the second speed holding valve 216 from the D-2 timing valve 70 through the oil path 78. Thus, the spool 234 is moved against the spring 236 and the output port 222 is connected to the 2-range input port 232. Also, in the 2-range, since the L-range modulator pressure Pml is not introduced from the L-range modulator valve 88 through the oil path 94 to the input port 204 in the L-range shift valve 200, the spool 212 is pressed against the input port 204 by the spring 214, so that the first output port 210 in the 2-range is connected to the input port 208 connected to the drain through the manual valve 46 and the second output port 228 is connected to the port 226. Thus, the line pressure Pl in the oil path 176 is sent to the brake B1 as the second speed frictional engaging device through the ports 226, 228, the second speed holding valve 216 and the 2-3 shift valve 240 to achieve the second speed engine brake (in the 2-range, the 2-3 shift valve 240 is held at the second speed position by the 2-range modulator pressure Pm2 in the control port 226).

In the L-range, the L-range modulator pressure Pml is introduced from the L-range modulator valve 88 to the input port 204 in the L-range shift valve 200, and the spool 212 is moved toward the 1-2 shift valve 184. Thus, in the L-range shift valve 200, the first output port 210 is connected to the input port 204 and the second output port 228 is connected to the drain 229. Therefore, the brake B2 as the L-range frictional engaging device is supplied with the L-range modulator pressure Pml as the engaging pressure to be put into the engaged condition, while the 2-range input port 232 in the second speed holding valve 216 is connected to the drain 229. Thus, even if the second speed holding valve 216 is located at the 2-range the position, i.e., the position in which the port 222 is connected to the port 232, by the stick in spite of the engaged condition of the brake B2, the oil is discharged from the brake B1 as the second speed frictional engaging device through the drain 229, and the brake B1 is prevented from being put into the engaged condition at the same time as the brake B2.

Figure 12:
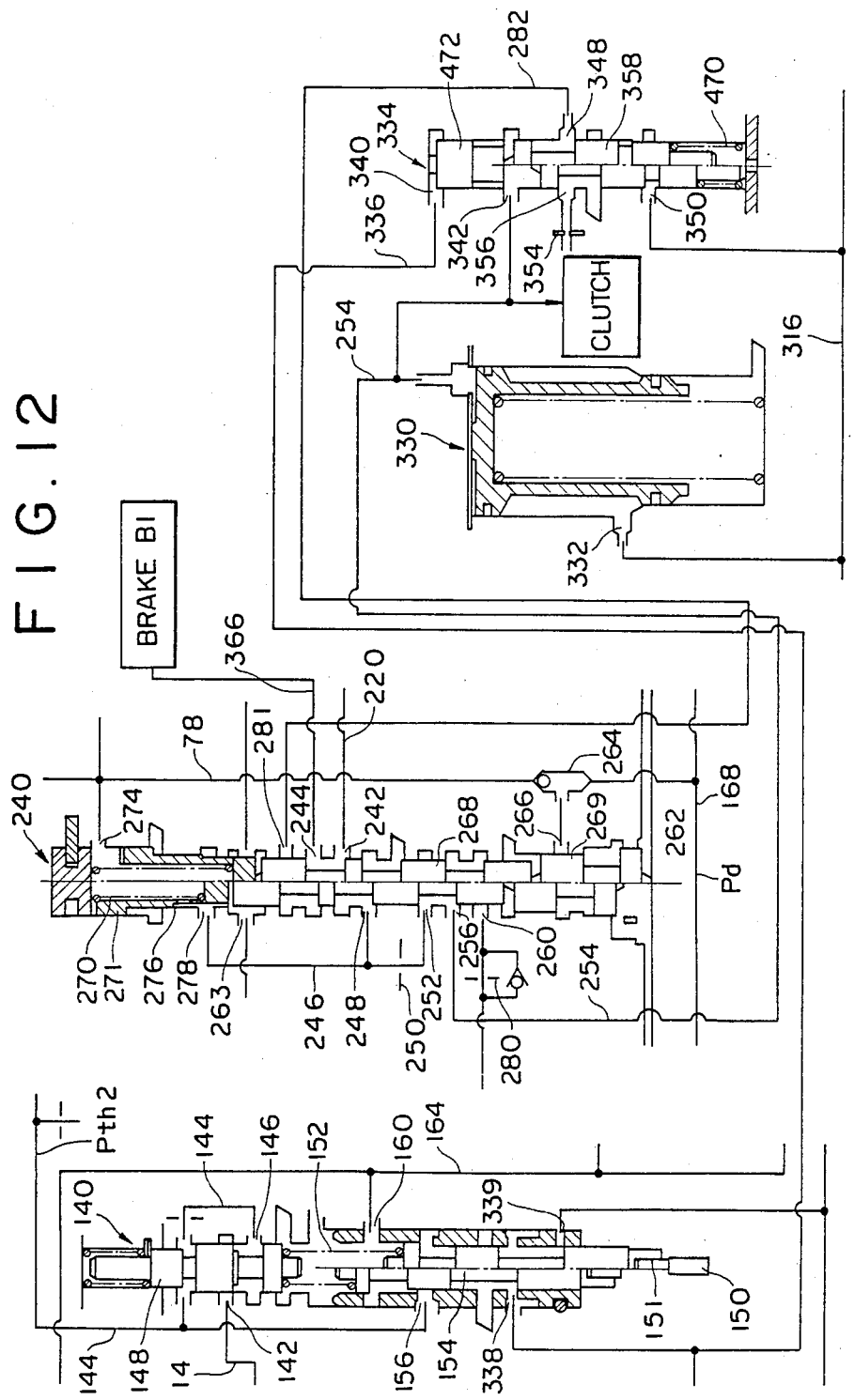
FIG. 12 is a view showing the principal portions of the present invention.

With reference to FIG. 12 will be described further principal parts of the embodiment.

The 2-3 shift valve 240 in the second speed introduces the line pressure Pl in the input port 242 to the output port 244 to put the brake B1 as the second speed frictional engaging device into the engaged condition and, in the third speed, and introduces the line pressure Pl in the input port 242 to the oil path 254 through the output port 248, orifice 250 and ports 252, 256 to put the clutch C2 as the third speed frictional engaging device into the engaged condition.

In the up-shift from the second speed to the third speed, since the output port 244 in the 2-3 shift valve 240 is connected to the port 281, the oil in the brake B1 is introduced to the input port 348 in the 2-3 timing valve 334 through the oil path 282. Within a predetermined time after the beginning of supply of oil to the clutch C2, the servo hydraulic pressure in the clutch C2, thus, the hydraulic pressure in the control port 342 in the 2-3 timing valve 334 is so small that the spool 358 is pressed against the plug 452 by the hydraulic pressure in the port 350 and the spring 450. Thus, since the oil in the input port 348 is discharged from the port 356 through the orifice 354 to the drain, the speed of discharging oil in the brake B1 is small and the brake B1 is still held in the engaged condition to produce a proper overlapping period (i.e. a period in which both the brake B1 and the clutch C2 are in the engaged condition). When the servo hydraulic pressure in the clutch C2, thus the hydraulic pressure in the control port 342 reaches a predetermined value, the spool 358 is moved toward the spring 470 against the hydraulic pressure in the port 350 and the spring 470. The input port 348 is connected also to the drain 352 together with the port 356. Accordingly, the oil in the brake B1 is quickly discharged through the drain 352 since the servo hydraulic pressure in the clutch C2 reaches a predetermined value, and the brake B1 is immediately released.

The up-shift from the second speed to the third speed will now be described when the intake throttle position is almost nil.

When the intake throttle position is almost nil, the port 338 communicates to the port 339 in the down-shift plug 154 of the second throttle valve 140. As a result, the line pressure Pl is supplied to the port 340 in the 2-3 timing valve 334 through the oil path 336 and the line pressure Pl in the port 340 presses the spool 358 toward the spring 470 through the plug 472. Thus, under such condition, when the up-shift is carried out from the second speed to the third speed, and the hydraulic pressure in the control port 342 is less than a predetermined value, the oil in the brake B1 is quickly discharged through the drain 352. When the intake throttle position is almost nil, the output torque of the engine is small, if the up-shift is carried out during this period, the engaging period of the high speed stage hydraulic pressure frictional engaging device is quickened while the releasing period of the low speed stage hydraulic pressure frictional engaging device is delayed. As a result, the overlapping period is elongated to produce shocks and uncomfortable blow sounds. In the device according to the present embodiment, however, the discharging rate of the oil in the brake B1 as the low speed stage frictional engaging device in the 2-3 up-shift is quickened, and the length of the overlapping period is to be held properly to prevent said problems.

While the embodiment has been described with reference to the up-shift from the second speed to the third speed, it will be apparent to the skilled in the art that the present invention is to be applied to the other up-shifts.

Figure 13:
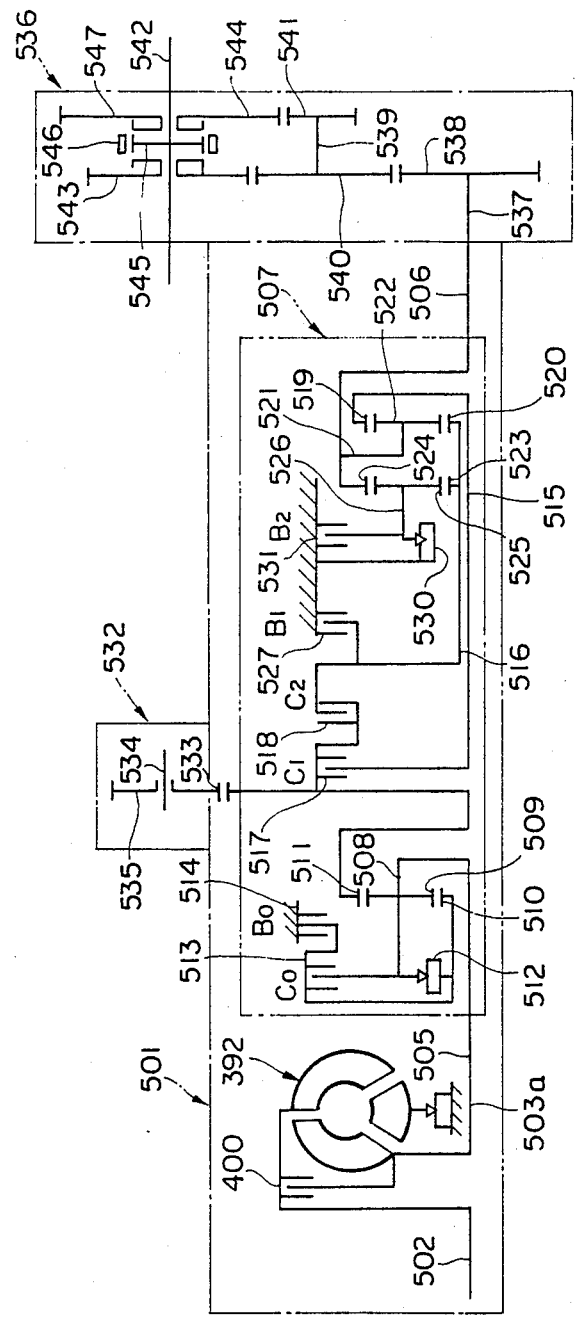
FIG. 13 is the skeletal of an automatic transmission which may be used in combination with the hydraulic pressure control apparatus according to the present invention.

FIG. 13 shows an automatic transmission which may be used in combination with the hydraulic pressure control apparatus according to the present invention. An automatic transmission 501, which is known per se, comprises an input shaft 502 coupled with an output shaft of a motor (not shown), the fluid type torque converter 392, the lock-up clutch 400 for connecting the input shaft 502 directly to an output shaft 503a of the fluid type torque converter 392 by bypassing the converter 392, a gear transmission 507 for giving some transmission characteristics to a shaft 505 connected to the output shaft 503a of the fluid type torque converter 392 as an input shaft to provide a driving force for driving the vehicle wheels to the output shaft 506.

The gear transmission 507 has a planetary gears which comprises a carrier 508 coupled with the input shaft 505, a planetary pinion 509 bore by said carrier, a sun gear 510 and a ring gear 511 engaged with said planetary pinion, a one-way clutch 512 provided between the carrier 508 and the sun gear 510, a clutch (Co) 513 for selectively connecting the carrier 508 and the sun gear 511, and a brake (Bo) 514 for fixing selectively the sun gear 510 with respect to a transmission case. The planetary gears are used as an overdrive device in the gear transmission 507.

The gear transmission 507 has another planetary gears which comprises a clutch ($C_1$) 517 for coupling selectively a counter shaft 515 with the ring gear 511, a clutch ($C_2$) 518 for coupling selectively a sun gear shaft 516 with the ring gear 511, a ring gear 519 coupled with the counter shaft 515, sun gears 520 and 523 coupled with the sun gear shaft 516, a planetary pinion 522 engaged with the ring gear 519 and the sun gear 520, a carrier 521 coupled with the output shaft 506 by bearing rotatably the planetary pinion 522, a ring gear 524 coupled with the output shaft 506, a planetary pinion 525 engaged with the sun gear 523 and the ring gear 524, a carrier 526 for bearing rotatably the planetary pinion 525, a brake ($B_1$) 527 for fixing selectively the sun gear 516 with respect to a transmission case, a one-way clutch 530 for fixing the carrier 526 for only one-way rotation with respect to the transmission case, and a brake ($B_2$) 531 for fixing selectively the carrier 526 with respect to the transmission case. The speed stages of three forward stages and one reverse stage are to be achieved with the planetary gears.

A power take-off device 532 is mounted on the automatic transmission 501. The power take-off device 532 has a drive side member of the clutch 517, i.e., a drive gear 533 mounted on an output member of said over drive device, and a power take-off gear 535 for engaging electively with the drive gear 533 by bearing rotatably a shaft 534 to be moved axially. The power take-off device 535 is coupled for driving with a mounting device by a power transmission device (not shown) to provide rotational power to said mounting device. The power take-off gear 535 is driven axially by a shift device driven by a PTO on-off operating lever (not shown) provided at a driver's seat to engage selectively with the drive gear 533.

The output shaft 506 is connected to an input shaft 537 of a transfer device 536. The transfer device 536 comprises an input gear 538 bore fixedly to the input shaft 537, a counter gear 540 for engaging with the input gear 538 by bearing fixedly to a counter shaft 539, another counter gear 541 bore fixedly, to the counter shaft 539, an output gear 543 for engaging with the counter gear 540 by bearing rotatably to an output shaft 542, a high speed side output gear 543 for engaging with the counter gear 541 by bearing rotatably to the output shaft 542, a low speed side output gear 544 for engaging with the counter gear 541 by bearing rotatably to the output shaft 542, and a clutch 547 including a slide sleeve 546 and a hub member 545 fixed to the output shaft 542 and coupling selectively either one of the high speed side output gear 543 and the low speed side output gear 544 with the output shaft 542 with power transmission relation. The clutch 547 is coupled for driving with a transfer switching operating lever provided at a driver's seat by a link device (not shown) to be operated by said operating lever, so that the transfer device 536 is to set for changing over the high speed stage, low speed stage and neutral stage.

The clutch and brake in the lock-up clutch 504 of the automatic transmission 501 and the gear transmission 507 are supplied selectively the hydraulic pressure or discharged the supplied hydraulic pressure by the hydraulic pressure control apparatus. As a result, the engagement or releasing condition of the lock-up clutch 504 are to be achieved selectively, and set for changing over the speed stages of one reverse stage and four forward stages including the over drive.

It will be apparent to those skilled in the art that various modifications and variations may be made in the elements of the invention without departing from the scope or spirit of the invention.

What is claimed as new and desired to be secured by Letters Patent of the United States is:

1. An automatic transmission of a vehicle, comprising:
   a gear transmission mechanism (507);
   a hydraulic fluid pressure source (10);
   a plurality of friction engaging means including
      a first friction engaging means (B2) adapted to be supplied with a hydraulic fluid pressure originated in said source to engage when said gear transmission mechanism provides a first speed stage; and
      a second friction engaging means (B1) adapted to be supplied with a hydraulic fluid pressure originated in said source to engage when said gear transmission mechanism provides a second speed stage and not to be supplied with the hydraulic fluid pressure to be disengaged when said gear transmission mechanism provides said first speed stage; and
   a hydraulic fluid pressure switching over system for selectively supplying and exhausting hydraulic fluid pressures originated in said source to and from said friction engaging means, including
      a manual valve (46) having a first port (52) for delivering a first detent fluid pressure originated in said source when said gear transmission mechanism is fixed to said first speed stage, and a second port (54) for delivering a second detent fluid pressure originated in said source when said gear transmission mechanism is fixed to said second speed stage;
      a speed shift valve (184) having an output port (194) for selectively supplying a hydraulic fluid pressure originated in said source when said gear transmission mechanism provides said second speed stage;
      a second speed holding valve (216) having a first input port (218), a second input port (232), an outlet port (222), a first control port (224) and a second control port (236) and adapted to connect said output port thereof with said first input port thereof under a spring biasing when said first and second control ports thereof are not supplied with said second and first detent fluid pressures, respectively, or when said first and second control ports thereof are supplied with said second and first detent fluid pressures, respectively, so as to transfer said hydraulic fluid pressure delivered from said speed shift valve toward said second friction engaging means, and to connect said output port thereof with said second input port thereof when said first control port thereof is supplied with said second detent fluid pressure while said second control port thereof is not supplied with said first detent fluid pressure; and a shift valve (200) having an input port (204) adapted to be supplied with a hydraulic fluid pressure originated in said source, an output port (210) connected with said first friction engaging means, a control port (204), an auxiliary input port (226) adapted to be supplied with a hydraulic fluid pressure originated in said source, an auxiliary output port (228) connected with said second input port of said second speed holding valve and a drain port (229), said shift valve being adapted to disconnect said output port thereof from said input port thereof while connecting said auxiliary output port thereof with said auxiliary input port thereof when said control port thereof is not supplied with said first detent fluid pressure and to connect said output port thereof with said input port thereof while disconnecting said auxiliary output port thereof from said auxiliary input port thereof so as to connect said auxiliary output port thereof with said drain port thereof when said control port thereof is supplied with said first detent fluid pressure.

2. An automatic transmission according to claim 1, wherein said speed shift valve (184) has an input port (190) adapted to be supplied with a hydraulic fluid pressure originated in said source, an output port (194) connected with said first input port of said second speed holding valve and a spool element (198) movable from a first shift position to disconnect said output port thereof from said input port thereof when said gear transmission mechanism provides said first speed stage to a second shift position to connect said output port thereof with said input port thereof when said gear transmission mechanism provides said second speed stage, said spool element being forced to said first shift position by said shift valve when said control port of said shift valve is supplied with said first detent fluid pressure.

3. An automatic transmission according to claim 1, wherein said gear transmission mechanism is adapted to provide a plurality of speed stages including a lowest speed stage and a next to lowest speed stage, said first speed stage being the lowest speed stage and said second speed stage being the next to lowest speed stage.

* * * * *